(12) United States Patent
Trefzer et al.

(10) Patent No.: US 6,829,529 B2
(45) Date of Patent: Dec. 7, 2004

(54) TRACTION CONTROL SYSTEM INCLUDING SETPOINT SLIP ADJUSTMENT

(75) Inventors: Mirko Trefzer, Ettlingen (DE); Thomas Sauter, Remseck (DE)

(73) Assignee: Robert Bosch GmbH, Stuttgart (GB)

( * ) Notice: Subject to any disclaimer, the term of this patent is extended or adjusted under 35 U.S.C. 154(b) by 98 days.

(21) Appl. No.: 10/400,099

(22) Filed: Mar. 25, 2003

(65) Prior Publication Data

US 2003/0216850 A1 Nov. 20, 2003

(30) Foreign Application Priority Data

Mar. 26, 2002 (DE) .......................................... 102 13 385
Aug. 23, 2002 (DE) .......................................... 102 38 755

(51) Int. Cl.$^7$ ............................ G06F 17/00; G06F 7/00
(52) U.S. Cl. ............................ 701/82; 701/70; 701/83; 701/90; 303/133; 303/167; 180/244
(58) Field of Search ............................ 701/70, 78, 82, 701/83, 84, 87, 90; 303/122.01, 122.03, 133, 139, 151, 167; 180/244, 275

(56) References Cited

U.S. PATENT DOCUMENTS 6,542,806 B1 * 4/2003 Suhre et al. .................. 701/82
6,587,774 B2 * 7/2003 Hessmert et al. ............. 701/83
6,658,343 B1 * 12/2003 Koch et al. ................... 701/71
6,659,568 B2 * 12/2003 Wandel .................... 303/115.4
2003/0167116 A1 * 9/2003 Andreas ....................... 701/74

* cited by examiner

Primary Examiner—Gertrude A. Jeanglaude
(74) Attorney, Agent, or Firm—Kenyon & Kenyon

(57) ABSTRACT

A method for providing traction control when starting off a vehicle on a road surface having different adhesive friction values between the right and left sides of the vehicle, the driven low-$\mu$ wheel being regulated to a specified setpoint slip pre-control value by a braking intervention if spinning occurs. In order to improve driving comfort, the engine speed is adjusted to the particular standing start conditions. To this end, the engine torque actually required for starting off is determined as soon as the vehicle is set in motion and has exceeded a specified speed threshold, and the engine speed actually required for starting off under the given conditions is determined from this. From this in turn, a new, corrected setpoint slip value is calculated and the setpoint slip is abruptly reduced or increased from the setpoint slip pre-control value to the newly calculated, corrected setpoint slip value.

5 Claims, 3 Drawing Sheets

TRACTION CONTROL SYSTEM INCLUDING SETPOINT SLIP ADJUSTMENT

FIELD OF THE INVENTION

The present invention relates to a method for traction control and a corresponding traction control system.

BACKGROUND INFORMATION

When a motor vehicle is accelerated on a road surface having different adhesive friction values between the right and left sides of the vehicle ($\mu$-split), and when making a hill start in particular, the spinning of the drive wheels may result in critical driving situations. By reducing the engine torque, and also by a braking intervention if necessary, the traction control system (TCS) attempts to maintain the vehicle in a stable range and improve traction.

The TCS may be set in such a manner that the vehicle does not roll back if at all possible even when making a hill start on a road surface having different adhesive friction values between the right and left sides of the vehicle ($\mu$-split), even if the driver gives too little gas. The engine torque specified by the TCS in the initial phase of a standing start, the engine torque pre-control value, may be configured for a gradient of 15% and more and is correspondingly high. A relatively high engine speed and a correspondingly high slip threshold are required for the low-$\mu$ wheel (driven wheel with low adhesive friction value) to apply this high engine torque pre-control value. If the spinning low-$\mu$ wheel is braked too strongly, the engine will not reach the rotational speeds at which the required torque may be generated.

As a result of the controller adjustment made, the engine torque and tire slip are only optimally adjusted for the extreme situation used as a basis, e.g., a 15% grade. However, at a lower gradient and on a level road surface in particular, more engine torque is generated than would actually be necessary to accelerate the vehicle appropriately. Of course, the unnecessarily high engine speeds and the excessive spin of the low-$\mu$ wheel reduce driving comfort. At a higher gradient (more than 15%), however, too little engine torque is applied so that the vehicle may roll back briefly.

SUMMARY OF THE INVENTION

The exemplary embodiment and/or method of the present invention provides a traction control system and a corresponding method, during which the engine speed set during a standing start is adapted to the instantaneous gradient.

The exemplary embodiment and/or method of the present invention determines the engine speed which is actually needed for starting off the vehicle and is present with an engine torque actually needed for starting off (the actually required engine torque is the torque that is exercised at the time of driving off or when exceeding a low speed threshold). A new setpoint slip value for the low-$\mu$ wheel is then calculated from the engine speed actually needed. The setpoint slip is finally reduced or increased abruptly from the specified setpoint slip pre-control value to the newly calculated setpoint slip value.

Analyzing the engine speed actually needed may allow adjustment of the setpoint slip optimally to the instantaneous requirement and consequently increase driving comfort significantly. When starting off on grades of less than 15%, excessive engine roar may be prevented. On steeper gradients, however, the engine speed may be corrected upward in order to obtain adequate acceleration even on steeper gradients.

The engine torque actually needed may be determined from the point in time at which the vehicle starts to move or exceeds a specified speed threshold.

According to an exemplary embodiment of the present invention, the engine speed actually required is read out from a set of speed/torque characteristic curves stored in the system.

After the setpoint slip is abruptly reduced or increased, the setpoint slip for the low-$\mu$ wheel may be reduced linearly.

In addition to the braking torque regulation, the TCS may intervene in the vehicle operation through an engine torque regulation.

DETAILED DESCRIPTION

Figure 1:
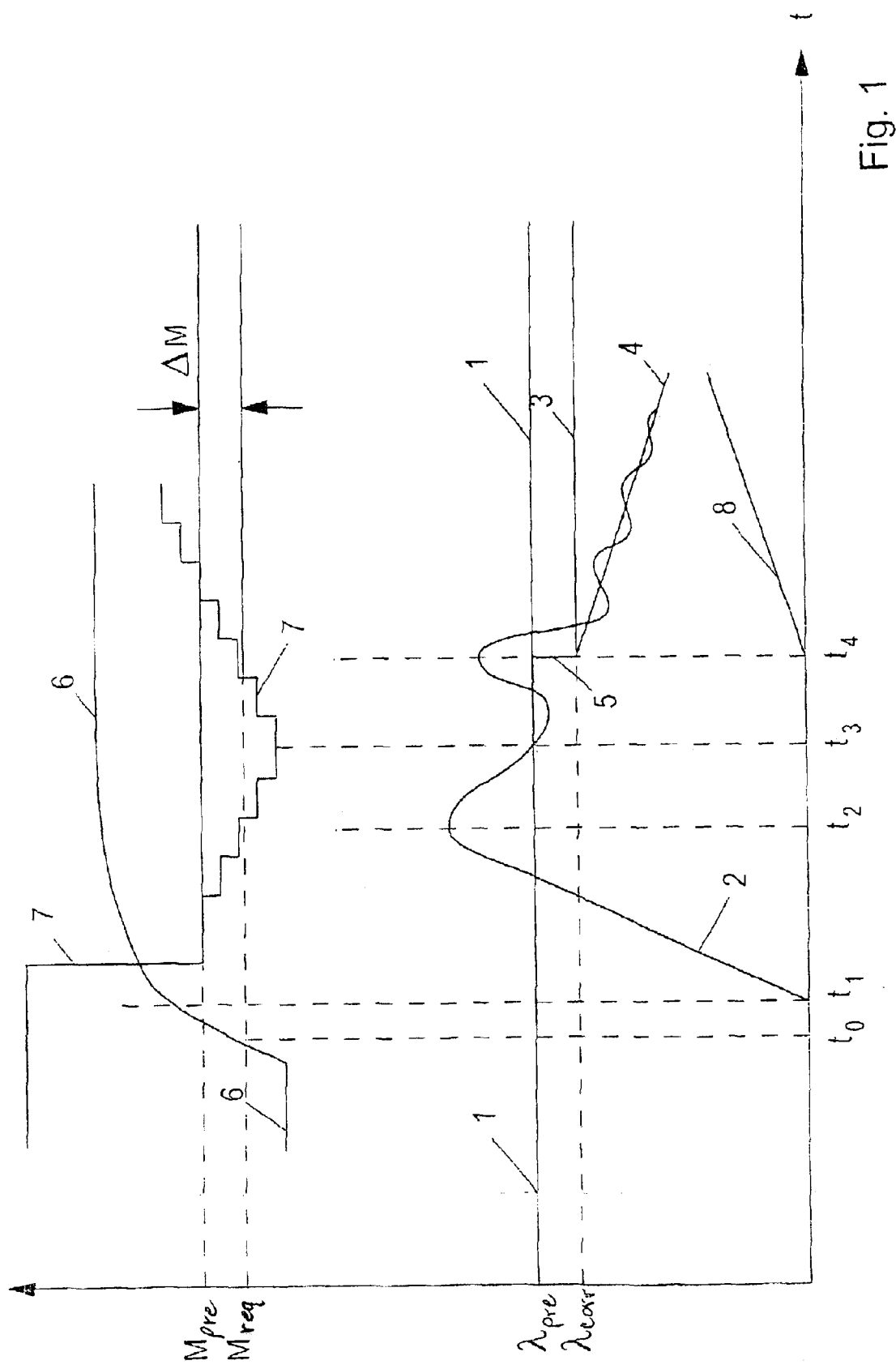
FIG. 1 shows the curve of wheel slip and engine torque during a TCS regulation.

FIG. 1 shows the curve of wheel slip and engine torque when a vehicle is started off on a road surface having different adhesive friction values between the right and left sides of the vehicle ($\mu$-split). Reference numeral 2 denotes the curve of the speed of the low-$\mu$ wheel and reference numeral 7 denotes the curve of the setpoint engine torque over time.

Reference numerals 1, 3, 4 denote various setpoint slip curves, to which speed 2 of the low-$\mu$ wheel is adjusted with different regulating methods.

The standing start begins at point in time t0, at which the driver attempts to set the vehicle in motion by pressing the accelerator pedal. The driver input is shown as characteristic curve 6.

Already from point in time t1, the wheel having the lower adhesive friction value (low-$\mu$ wheel) starts to spin. The TCS recognizes this and calculates a pre-control value lambda$_{pre}$ and M$_{pre}$, respectively, for the allowable wheel slip and for the engine torque, the pre-control values being selected high enough to prevent the vehicle from rolling back even when starting off on a hill having, e.g., a gradient of up to 15%. The pre-control values may also be configured for a gradient of 20%, for example.

The calculation of the setpoint slip pre-control value lambda$_{pre}$ and the engine torque pre-control value M$_{pre}$ will be explained briefly in the following: the drive torque Mdrive required to hold the vehicle in equilibrium on a 15% hill gradient is calculated from the downgrade force Mdowngrade and the applied braking torque Mbrake on the low-$\mu$ side of the vehicle. The following applies:

Mdrive=$\mu_{low}$*Mdowngrade=Mbrake, where:

Mdowngrade=m*g*r*sin$\alpha$.

m: vehicle mass g: gravitational acceleration r: effective wheel radius

Assuming an adhesive friction value on the low-$\mu$ side of, e.g., $\mu_{low}$=0.1 and on the high-$\mu$ side of $\mu_{high}$=1, and a gradient of 15%, this may be calculated from the required drive torque Mdrive and the required braking torque Mbrake. The associated engine torque may be calculated directly from the calculated drive torque.

Figure 2:
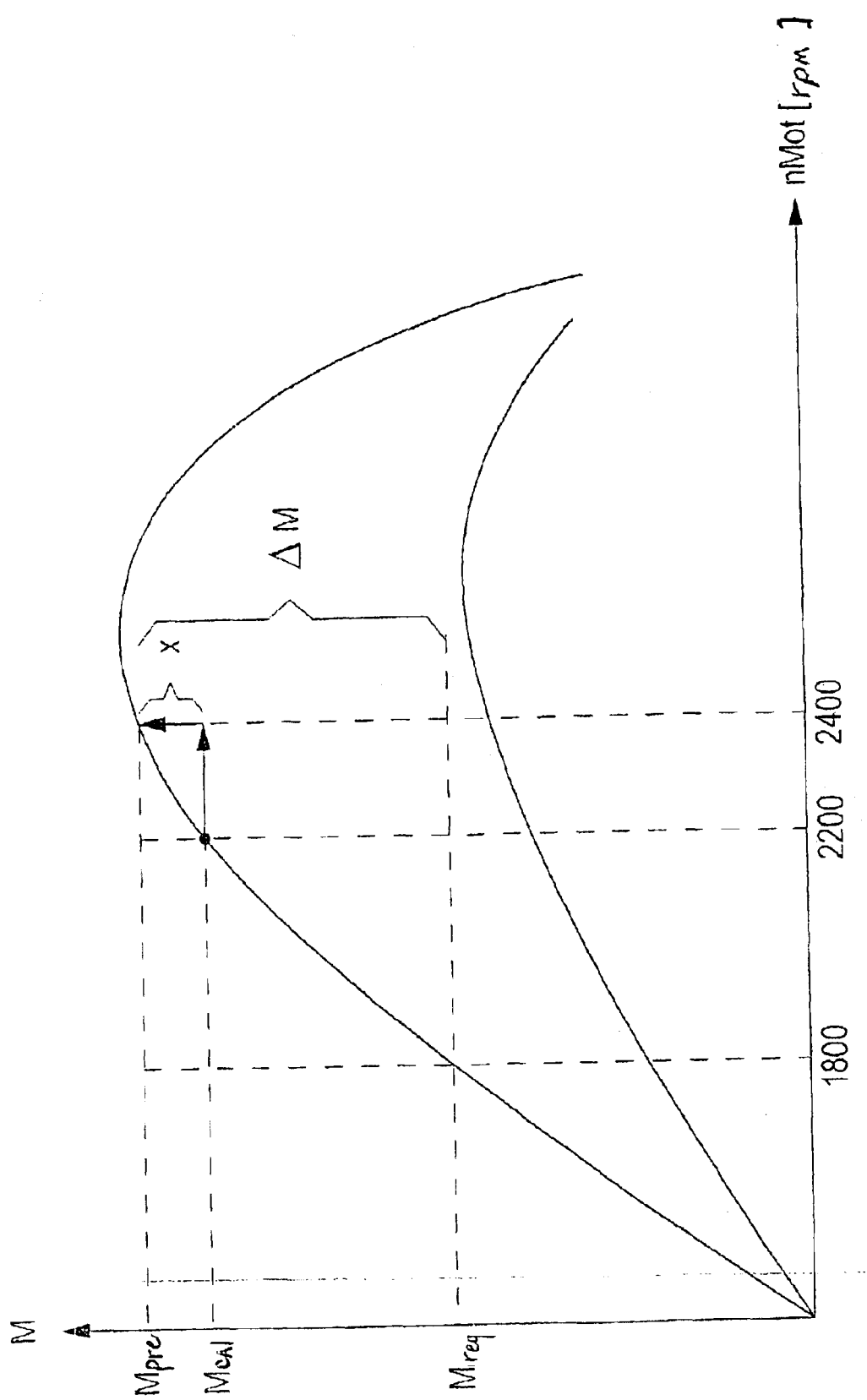
FIG. 2 shows a plurality of engine torque/speed characteristics at different throttle valve angles.

This result is engine torque Mcal, which is required to hold the vehicle in equilibrium under the given conditions (see FIG. 2). This engine torque Mcal is to be raised by a specific additional amount in order to ensure an acceleration of the vehicle on the hill gradient. Reference symbol x shows the increase in FIG. 2. The resulting torque is engine torque pre-control value $M_{pre}$.

To calculate the setpoint slip pre-control value, the engine speed required to generate calculated engine torque Mcal is first determined. This may be done, for example, using engine torque/rotational speed characteristic curves such as those shown in FIG. 2.

For the 15% hill gradient, for example, the calculation results in an engine torque as plotted on the uppermost of the two curves. This torque is reached at a rotational speed of, e.g., 2,200 rpm.

The engine torque pre-control value is reached at a setpoint rotational speed of 2,400 rpm. Converted to a speed, this is used as a setpoint speed for the wheel to be regulated. The wheel speed of the low-$\mu$ wheel may be calculated from the engine speed, for example, using the following equation:

$$V_{dr\_low}[m/s] = 2 * \frac{nMot[1/\min] \cdot 2 \cdot \Pi \cdot r}{\text{Total transmission ratio} \cdot 60 \text{ s}},$$

where $V_{dr\_low}$: speed of the driven low-$\mu$ wheel.

Back in FIG. 1, speed 2 of the low-$\mu$ wheel from point in time t1, with the vehicle still not moving, is adjusted to the calculated setpoint slip pre-control value lambda$_{pre}$.

Between points in time t1 and t2, the slip of low-$\mu$ wheel 2 is limited by a pulse-like increase of the brake pressure and by simultaneously reducing setpoint engine torque 7 until the slip reaches a reversal point at point in time t2.

Setpoint engine torque 7 is reduced until slip 2 of the low-$\mu$ wheel at point in time t3 again drops below the setpoint slip pre-control value lambda$_{pre}$. After that, setpoint engine torque 7 is increased again stepwise. Slip 2 of the low-$\mu$ wheel is further adjusted to setpoint slip pre-control value lambda$_{pre}$ until the vehicles starts to move at point in time t4.

At the moment at which the vehicle starts to move, new information may be obtained concerning the starting off conditions, which, among other things, may be used to calculate a new, corrected setpoint engine speed or to determine a new setpoint slip value lambda$_{corr}$ for the low-$\mu$ wheel. The torque delivered by the engine at the moment of starting off (point in time t4) corresponds to torque Mreq actually required for starting off.

In the example shown in FIG. 1, this torque Mreq is lower than specified engine torque pre-control value $M_{pre}$. Thus the engine speed may be set to nMot to a lower value at which the vehicle engine generates only the engine torque Mreq actually required for starting off.

To determine the new, corrected setpoint engine speed nMot, the TCS again analyzes the engine torque/speed characteristic curves shown in FIG. 1 at the point at which torque Mreq is actually required. In the example of FIG. 1, the new engine speed is 1,800 rpm. Using the conversion formula already stated, in turn the new engine speed may be converted to a wheel slip.

This new wheel slip is equal to the corrected setpoint slip lambda$_{corr}$, to which the braking torque regulation now adjusts speed 2 of the low-$\mu$ wheel. The reduction of the setpoint slip (and accordingly the engine speed) at point in time t4 may be recognized as discontinuity 5 in FIG. 1.

Analyzing the engine torque actually required may allow adjustment of the setpoint slip optimally to the instantaneous requirement and consequently increase driving comfort significantly. When starting off on gradients less than 15%, excessive engine roar may be prevented. On steeper grades, however, the engine speed may be corrected upward in order to obtain adequate acceleration even on steeper gradients.

After the vehicle is started off (the curve of the vehicle speed is indicated by reference numeral 8) at point in time t4, the corrected setpoint slip value may be retained (line 3) or the corrected setpoint slip value may be reduced linearly (line 4).

Figure 3:
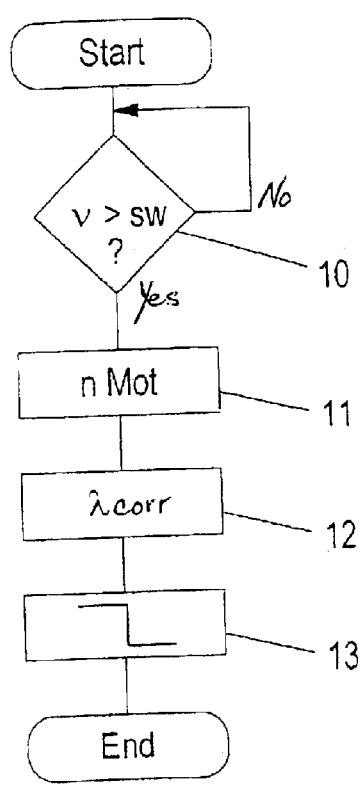
FIG. 3 shows a flow chart to explain the TCS method, the setpoint slip pre-control value being adapted to the actual need.

FIG. 3 once again shows the method steps in adapting the setpoint slip to the instantaneous requirement in the form of a flow chart. In step 10, it is first checked if the vehicle has already been set in motion in a standing start on a road surface having different adhesive friction values and has exceeded a specified speed threshold. If this is the case, the instantaneous engine speed nMot is determined first and a new corrected setpoint slip value lambda$_{corr}$ is calculated (steps 11, 12). In step 13, setpoint slip 1 is finally adjusted to the newly calculated setpoint slip value lambda$_{corr}$.

Figure 4:
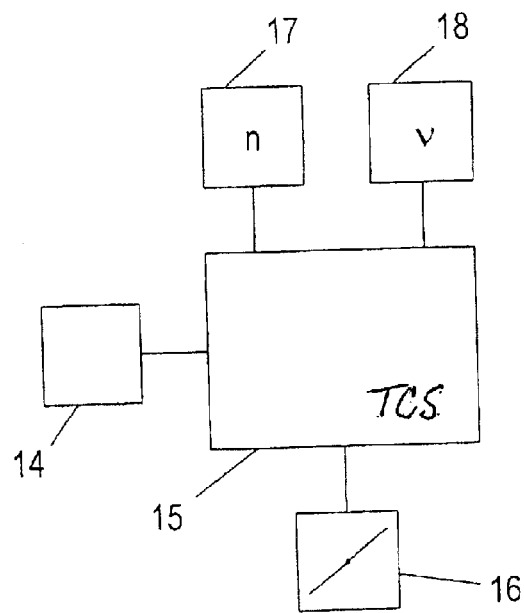
FIG. 4 shows a schematic representation of a TCS.

FIG. 4 shows a traction control system including a central control unit 15, which interacts with a plurality of wheel brakes 14 to set a setpoint slip and a throttle valve 16 to set an engine torque. The TCS also includes sensors for determining engine speed nMot and for determining vehicle speed v. TCS 15 is configured in such a manner that it implements the method described above referring to FIG. 3 in order to adjust setpoint slip 1 to the instantaneous requirement.

What is claimed is:

1. A method for providing traction control when starting off a motor vehicle on a road surface having different adhesive friction values between a right side and a left side of the motor vehicle, the method comprising:

regulating a driven low-$\mu$ wheel to a predefined setpoint slip pre-control value by a braking intervention when spinning occurs;

determining an instantaneous engine speed which is present when one of the motor vehicle is driven off and a low speed threshold is exceeded;

calculating a corrected setpoint slip value based on the instantaneous engine speed; and one of abruptly reducing and increasing a setpoint slip from the predefined setpoint slip pre-control value to the corrected setpoint slip value.

2. The method of claim 1, further comprising:

determining an engine torque actually required;

wherein the instantaneous engine speed is determined using the engine torque actually required and at least one rotational speed-torque characteristic curve.

3. The method of claim 1, further comprising:

linearly reducing the setpoint slip for the driven low-$\mu$ wheel, after one of abruptly reducing and increasing the setpoint slip.

4. The method of claim 1, wherein an engine torque is increased as a vehicle speed increases.

5. A traction control system for starting off a motor vehicle on a road surface having different adhesive friction values between a right side and a left side of the motor vehicle, the traction control system comprising:

a first arrangement to regulate a driven low-$\mu$ wheel to a predefined setpoint slip pre-control value by a braking intervention when spinning occurs;

a second arrangement to determine an instantaneous engine speed which is present when one of the motor vehicle is driven off and a low speed threshold is exceeded;

a third arrangement to calculate a corrected setpoint slip value based on the instantaneous engine speed; and a fourth arrangement to one of abruptly reduce and increase a setpoint slip from the predefined setpoint slip pre-control value to the corrected setpoint slip value.

* * * * *